United States Patent [19]
Akamatsu et al.

[11] Patent Number: 4,937,271
[45] Date of Patent: Jun. 26, 1990

[54] PROCESS FOR POST-TREATING PRE-EXPANDED POLYOLEFIN RESIN PARTICLES

[75] Inventors: Naruhiko Akamatsu, Ibaraki; Hiroyuki Yoshida, Akashi; Masakazu Taniguchi, Takasago; Takatsugu Yamamoto, Himeji, all of Japan

[73] Assignee: Kanegafuchi Kagaku Kogyo Kabushiki Kaisha, Osaka, Japan

[21] Appl. No.: 353,579

[22] Filed: May 18, 1989

[30] Foreign Application Priority Data

May 19, 1988 [JP] Japan ................................ 63-122290

[51] Int. Cl.$^5$ .............................. C08J 9/22; C08J 9/40
[52] U.S. Cl. ...................................... 521/58; 521/60; 521/98; 521/918
[58] Field of Search ...................... 521/58, 98, 918, 60

[56] References Cited

U.S. PATENT DOCUMENTS 4,682,989 7/1987 Maeda et al. ........................... 55/23

Primary Examiner—Morton Foelak
Attorney, Agent, or Firm—Armstrong, Nikaido, Marmelstein, Kubovcik & Murray

[57] ABSTRACT

A process for post-treating pre-expanded polyolefin resin particles which comprises charging in a vessel pre-expanded polyolefin resin particles which are pre-expanded by using an inflammable blowing agent, supplying an inert gas into the vessel, and then discharging the inert gas with the inflammable blowing agent gas extracted from the pre-expanded polyolefin resin particles, from the vessel. According to the process of the invention, the inflammable blowing agent can be extracted efficiently, safely and in a short time from the pre-expanded polyolefin resin particles which are pre-expanded by using the inflammable blowing agent. Consequently, the spontaneous cambustion of the particles can be completely avoided even if sparks are generated on the surface of the pre-expanded particles, therefore, it becomes easy to handle the pre-expanded polyolefin resin particles because the particles can be dried and transported by a pneumatic conveyer.

3 Claims, 1 Drawing Sheet

PROCESS FOR POST-TREATING PRE-EXPANDED POLYOLEFIN RESIN PARTICLES

BACKGROUND OF THE INVENTION

The present invention relates to a process for post-treating pre-expanded polyolefin resin particles. More particularly, the present invention relates to a process for post-treating pre-expanded polyolefin resin particles which eliminates a danger that pre-expanded polyolefin resin particles, which are pre-expanded by using an inflammable blowing agent, spontaneously ignite in the air.

Recently, for heat insulating materials and the like, including energy absorbers such as an automobile bumper core, there are used foams prepared from pre-expanded polyolefin resin particles by means of, for example, expansion molding in a mold.

The pre-expanded polyolefin resin particles are generally produced as follows:

A pressure vessel is charged with the resin particles, water, and the like. As a blowing agent, a Flon gas (chlorofluoro hydrocarbon) such as dichlorodifluoromethane or dichlorotetrafluoroethane is introduced under pressure into the pressure vessel, and the inner pressure of the vessel is raised by heating to impregnate the resin particles with the blowing agent. Then, the resin particles are released into the atmospheric pressure.

However, the blowing agent, the Flon gas is restricted in its use, because it is said that the blowing agent of the Flon gas diffuses in the air, rises to the stratosphere, and destroys the ozone layer. As a result, the rate that injurious radioactive ray reaches the earth increases, and there is a fear that the injurious radioactive ray causes many cases of diseases such as skin cancer.

Therefore, as a blowing agent substitutive for the Flon gas, an aliphatic hydrocarbon gas such as propane, butane, pentane or hexane becomes popular. However, in case of using the aliphatic hydrocarbon gas as the blowing agent, when the produced pre-expanded particles are allowed to stand in the air, the pre-expanded particles are always in danger that the aliphatic hydrocarbon gas gradually released from the inside of the pre-expanded particles catches fire from static electricity or the like on the surface of the pre-expanded particles, and the pre-expanded particles burst into flames.

An object of the present invention is to provide a process capable of giving pre-expanded particles without involving the danger that the blowing agent released from the inside of the pre-expanded particles catches fire from sparks generated on the surface of the particles due to static electricity, and the pre-expanded particles burst into flames.

This and other objects of the present invention will become apparent from the description hereinafter.

SUMMARY OF THE INVENTION

It has now been found that when the particles pre-expanded by using the inflammable aliphatic hydrocarbon gas as the blowing agent, are post-treated by using an inert gas, the inflammable blowing agent in the pre-expanded particles is substituted with the inert gas, and consequently the post-treated pre-expanded particles does not exhibit flammability in the least.

That is, in accordance with the present invention, there is provided a process for post-treating pre-expanded polyolefin resin particles which comprises charging a vessel with pre-expanded polyolefin resin particles containing an inflammable blowing agent, supplying an inert gas into the vessel, and discharging the inert gas with the inflammable blowing agent gas extracted from the pre-expanded polyolefin resin particles, from the vessel.

DETAILED DESCRIPTION

Figure 1:
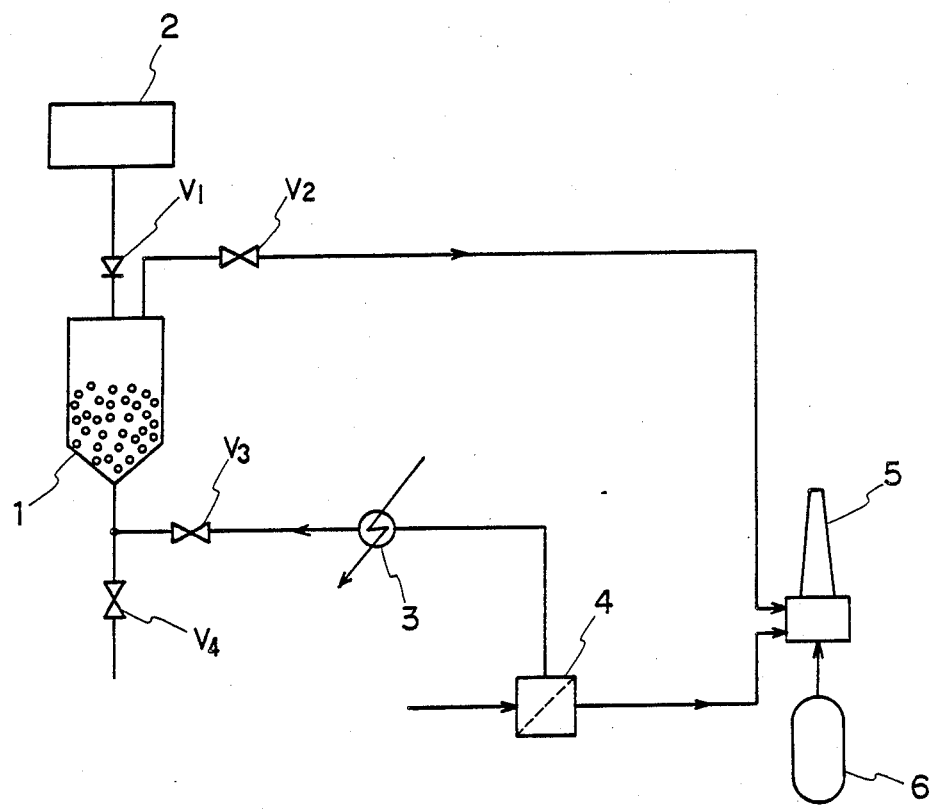
FIG. 1 is an schematic illustration showing an embodiment of the process for post-treating the pre-expanded polyolefin resin particles according to the present invention.

Examples of the polyolefin resin used in the present invention are, for instance, propylene resins such as homopolypropylene, an ethylene-propylene random copolymer, an ethylene-butene-propylene random terpolymer, a polypropylene crosslinked with a silane, an ethylene-propylene block copolymer, a propylene-vinyl chloride copolymer, a propylene-butene copolymer and a copolymer of propylene and maleic anhydride; polyethylene resins such as a low density polyethylene, a linear low density polyethylene, a high density polyethylene, an ethylene-vinyl acetate copolymer and a crosslinked polyethylene; and the like. These polyolefin resins may be used alone or as an admixture thereof. Among them, the propylene resins such as the ethylene-propylene random copolymer and the ethylene-butene-propylene random terpolymer are especially preferable since the resins are excellent in heat resistance and also in moldability. The linear low density polyethylene is also preferable because of the simple pre-treatment prior to molding and of the excellent moldability.

Usually, the polyolefin resins are previously melted by using an extruder, a kneader, a Banbury mixer, a roll, or the like, and are formed into particles having a desired shape such as a cylinder, a cylindroid, a sphere, a cube or a rectangular parallelapiped, and having an average particle diameter of 0.1 to 10 mm, preferably from 0.7 to 5 mm, in order to easily utilize for pre-expansion. The term "average particle diameter" as shown herein is the diameter of an equivalent sphere.

Processes for pre-expanding the polyolefin resins are not particularly limited. For example, the following process is exemplified:

The blowing agent of an aliphatic hydrocarbon such as propane, butane, pentane or hexane is contained in the polyolefin resin particles in a pressure vessel, and the resin particles are dispersed into water with stirring. After heating to a prescribed expansion temperature under pressure, the aqueous dispersion is released into a low pressure zone. The amount of the blowing agent is not particularly limited, and suitably decided according to the desired expansion ratios of the pre-expanded polyolefin resin particles. Usually, the amount of the blowing agent is from 5 to 50 parts by weight per 100 parts by weight of the polyolefin resin.

When preparing the aqueous dispersion, there can be used a dispersing agent such as calcium tertiary phosphate, basic magnesium carbonate, basic zinc carbonate or calcium carbonate, a surface active agent such as sodium dodecylbenzenesulfonate, sodium n-paraffinicsulfonate or sodium α-olefinsulfonate, or the like. The amount of the dispersing agent or the surface active agent depends on the kinds of the dispersing agent or the surface active agent, and the kinds and amounts of the polyolefin resins used. Usually, the amount of the dispersing agent is 0.2 to 5 parts by weight per 100 parts by weight of water, and the amount of the surface active agent is 0.001 to 0.3 part by weight per 100 parts by weight of water.

Usually, it is preferable to use the polyolefin resin particles containing the volatile blowing agent in an amount of 20 to 100 parts by weight per 100 parts by weight of water in order to satisfy the dispersibility in water.

The thus obtained pre-expanded polyolefin resin particles must be treated very carefully since the particles catch fire and burn by sparks which is caused by, for instance, static electricity on the particle surface, when coming the particles in contact with the air.

Accordingly, it is desirable to promptly introduce the produced pre-expanded particles into a vessel for extracting the inflammable blowing agent gas contained in the pre-expanded particles. Also, it is preferable that the air in the vessel is previously replaced with an inert gas, so that the pre-expanded particles do not catch fire even if causing sparks due to static electricity on the particle surface.

Examples of the inert gas are, for instance, nitrogen gas, carbon dioxide gas, a rare gas such as helium gas or argon gas, and the like. The inert gases may be used alone or as an admixture thereof. As the inert gas, one sealed in a gas cylinder which is available in the market can be used. In consideration of costs and workability, it is preferable to utilize nitrogen gas separated from the air by using a membrane separater, an adsorption separater, or the like (hereinafter referred to as "separated nitrogen"). As the membrane separater, there are, for instance, exemplified, "PRISM ALPHA" from Permea Inc. and "Nitrogen Membrane System" from Union Carbide Corp., both of which are commercially available. As an adsorption separater, a pressure swing type adsorption using carbon molecular sieve as adsorbent is well known for separating air to high concentration of nitrogen. When any of foregoing methods is used, a gas mixture containing 95 to 99% by volume of nitrogen gas is separated from the air, and the gas mixture containing a high concentration of nitrogen gas (hereinafter referred to as "high concentration nitrogen gas") can be used as it is as the inert gas.

When the inert gas contains a large amount of oxygen gas, there is a fear of the ignition of pre-expanded particles. Accordingly, the concentration of oxygen gas in the inert gas is adjusted to not more than 12% by volume, preferably not more than 10% by volume though the concentration of oxygen gas depends on the kinds of the inflammable blowing agent.

In order to avoid that the thus produced pre-expanded particles come in contact with the air, it is preferable that the apparatus for preparing the pre-expanded particles is connected with the extracting vessel through a pipe or the like.

The aforementioned vessel for extraction is a vessel used for extracting the inflammable blowing agent contained in the pre-expanded particles, and any vessel can be used so long as the vessel can resist the pressure and temperature of the inert gas which is supplied into the vessel. Examples of the vessels are, for instance, a vessel made of stainless steel and having a shape of cylinder of which lower part is a corn, and the like.

The temperature of the inert gas supplied into the vessel is not particularly limited, and the temperature is adjusted within the range of from 35° C. to a melting point of the pre-expanded particles. When the apparatus for preparing the pre-expanded particles and the extracting vessel are connected each other with a pipe or the like to directly supply the prepared pre-expanded particles into the vessel, the pre-expanded particles are damp a little due to moisture stuck on the particles. Therefore, it is preferable to raise the temperature of the inert gas to, for instance, 35° C. to 95° C. in order to dry the pre-expanded particles.

Also, when the inert gas is supplied into the vessel, pressure and supplying velocity of the inert gas are not particularly limited. The pressure of the inert gas is suitably decided so long as the inert gas can be supplied into the vessel, and usually adjusted to not less than 0.1 kg/cm$^2$·G, preferably from 0.1 to 7 kg/cm$^2$·G. The supplying velocity of the inert gas varies depending on the amount of the pre-expanded particles charged in the vessel. So the velocity cannot be unconditionally decided. Usually, it is preferable to adjust the superficial velocity which is defined as a velocity in an empty column to 0.001 to 10 m/sec, preferably 0.05 to 3 m/sec. When the superficial velocity is less than 0.001 m/sec, a long time is required to extract the inflammable blowing agent from the pre-expanded particles, and when the superficial velocity is more than 10 m/sec, the operation is difficult because the pre-expanded particles violently flow in the vessel, in addition, when using the separated nitrogen, it is necessary to separate a large quantity of air, which costs high.

The inert gas is supplied into the vessel until the content of the inflammable blowing agent in the pre-expanded particle is reduced to not more than 5% by weight based on the weight of the pre-expanded particle. When the content of the inflammable blowing agent in the particle is more than 5% by weight, there is the danger that the pre-expanded particles catch fire spontaneously due to static electricity when allowing to stand them in the air.

According to the process of the present invention, about not less than 95% by weight of the inflammable blowing agent contained in the pre-expanded particle can be extracted only in about 1 hour.

The gas mixture of the inert gas and the inflammable blowing agent gas extracted from the pre-expanded particles is discharged from the extracting vessel. The inflammable blowing agent gas in the gas mixture may be recovered and then reused, or may be burned.

As a method for burning the gas mixture of the inert gas and the inflammable blowing agent gas, there is exemplified a method in which the gas mixture is mixed with a gas mixture containing a high concentration of oxygen gas (hereinafter referred to as "high concentration oxygen gas") which is separated from air by using the membrane or adsorption separator, and a combustion improver such as liquefied natural gas, petroleum, e.g. kerosen, or the like, and then the mixed gas is burned by using a burner, or the like. In the process mentioned above, there is a merit that the high concentration oxygen gas, which is the unnecessary gas in case of separating air into the high concentration nitrogen gas and the high concentration oxygen gas by using the membrane or adsorption separator can be effectively used.

The process for post-treating the pre-expanded polyolefin resin particles according to the present invention is more specifically explained by means of FIG. 1, but the present invention is not limited thereto.

FIG. 1 is a schematic illustration showing an embodiment of the process for post-treating the pre-expanded polyolefin resin particles. In FIG. 1, 1 is the vessel for extracting the inflammable blowing agent from the pre-expanded particles. The vessel 1 is connected with the apparatus for preparing the pre-expanded particles 2 through a valve $V_1$.

The pre-expanded particles prepared in the apparatus 2 are supplied into the vessel 1 by opening the valve $V_1$. The inert gas supplied from the membrane or adsorption column 4, a gas cylinder, or the like is heated to the prescribed temperature by a heater 3, and then supplied into the vessel 1 with the valves $V_4$ and $V_1$ closed and with the valve $V_3$ open.

The inert gas supplied into the vessel 1 is substituted for the inflammable blowing agent in the pre-expanded particles and the rest of the inert gas is mingled with the extracted inflammable blowing agent gas, then the mixed gas is fed into the burner 5 by opening the valve $V_2$. The gas fed into the burner 5 is burned with the high concentration oxygen gas obtained by using the membrane or adsorption column 4, and as occasion demands, with the combustion improver 6.

As mentioned above, according to the present invention, the inflammable blowing agent gas can be safely and efficiently extracted from the pre-expanded polyolefin resin particles containing the inflammable blowing agent. Furthermore, when the extracted inflammable blowing agent gas is burned, carbonic acid gas and steam are mainly produce. Therefore, the extracted inflammable blowing agent gas can be disposed without causing any environmental aggravation, which occurs when the Flon gas is released into the air.

According to the process for post-treating the pre-expanded polyolefin resin particles of the invention, the flammable blowing agent can be extracted efficiently, safely and in a sort time from the pre-expanded polyolefin resin particles which are pre-expanded by using the inflammable blowing agent. Accordingly, the combustion of the particles can be completely prevented even if sparks are generated on the surface of the pre-expanded particles from which the inflammable blowing agent is extracted. Also, since injurious gas is not generated when burning the extracted inflammable blowing agent, the disposal of the extracted inflammable blowing agent is simple and easy.

Further, when the high concentration nitrogen gas, selectively separated from air by using the membrane or absorption, is used as the inert gas, raw materials for the inert gas are unnecessary. Consequently, the process of the invention is advantageous in costs. Also, if the high concentration oxygen gas obtained as the by-product is utilized when burning the extracted inflammable blowing agent gas, the efficiency can be improved.

The pre-expanded polyolefin resin particles from which the inflammable blowing agent gas is extracted until the concentration of the inflammable gas reaches to the concentration such that the spontaneous combustion of the pre-expanded particles does not occur in the air, can be dried in the air or transported by a pneumatic conveyor, accordingly, it becomes easy to handle the pre-expanded polyolefin resin particles.

The present invention is more specifically described and explained by means of the following Examples in which all % is by weight unless otherwise noted. It is to be understood that the present invention is not limited to the Examples, and various changes and modifications may be made in the invention without departing from the spirit and scope thereof.

EXAMPLE 1

The post-treatment was carried out on 25 kg of pre-expanded particles shown in Table 1 by using a vessel show in FIG. 1.

The capacity of the vessel 1 used was 1.6 $m^3$ and an inert gas was adjusted to a temperature of 50° C., a supplying velocity of 0.1 m/sec as a superficial velocity, and a supplying pressure of 0.1 $kg/cm^2 \cdot G$. As the inert gas, a high concentration nitrogen gas (nitrogen content: 95% by volume oxygen content: 5% by volume), which was obtained by separating air with Prism ®, was used.

Then, the amount of the inflammable blowing agent remaining in the pre-expanded particles after beginning the supply of the inert gas was measured by using gas chromatography. The results are shown in Table 2.

TABLE 1

| Physical properties of the pre-expanded particle | |
|---|---|
| Weight per one particle | 1.35 mg |
| Resin component | Ethylene-propylene random copolymer (Density: 0.9 $g/cm^3$, Melt index (MI): 9.0, Ethylene content: 4.5%, Vicat softening point: 119° C.) |
| True density (Expansion ratio: 30) | 0.03 $g/cm^3$ |
| Amount of inflammable blowing agent (isobutane) | 5 kg |

TABLE 2

| Time passed (minute) | Amount of the inflammable blowing agent remaining in the pre-expanded particles (kg) |
|---|---|
| 0 | 5 |
| 10 | 1.8 |
| 20 | 0.5 |
| 30 | 0.1 |
| 40 | 0.05 |

As apparent from the results shown in Table 2, it is confirmed that 90% of the inflammable blowing agent was extracted into the inert gas after 20 minutes passed from the start of the supply of the inert gas.

The mixed gas of the inflammable blowing agent and the inert gas was discharged from the vessel 1 and fed into the burner 5. Then, the mixed gas was burned with the high concentration oxygen gas (oxygen content: 32% by volume, nitrogen content: 68% by volume) obtained by using the membrane 4. During the burning, carbonic acid gas and steam were produced, but the generation of injurious gas was not seen.

EXAMPLE 2

The post-treatment was carried out on 25 kg of pre-expanded particles shown in Table 3 in the same manner as in Example 1 except that the inert gas was adjusted to a temperature of 35° C., a supplying velocity of 0.1 m/sec as the superficial velocity, and a supplying pressure of 0.1 $kg/cm^2 \cdot G$.

Then, the amount of the inflammable blowing agent remaining in the pre-expanded particles after beginning the supply of the inert gas was measured in the same manner as in Example 1. The results are shown in Table 4.

TABLE 3

| Physical properties of the pre-expanded particle | |
| --- | --- |
| Weight per one particle | 4.5 mg |
| Resin component | Linear low density polyethylene (Density: 0.29 g/cm$^3$, MI: 0.8, Vicat softening point: 97° C.) |
| True density (Expansion ratio: 25) | 0.0368 g/cm$^3$ |
| Amount of inflammable blowing agent (isobutane) | 6 kg |

TABLE 4

| Time passed (minute) | Amount of the inflammable blowing agent remaining in the pre-expanded particles (kg) |
| --- | --- |
| 0 | 6 |
| 10 | 2.8 |
| 20 | 1.3 |
| 30 | 0.6 |
| 40 | 0.3 |
| 50 | 0.1 |

As apparent from the results shown in Table 4, it is confirmed that 90% of the inflammable blowing agent was extracted into the inert gas after 30 minutes passed from the start of the supply of the inert gas.

The mixed gas of the inflammable blowing agent and the inert gas was discharged from the vessel 1 and fed into the burner 5. Then, the mixed gas was burned in the same manner as in Example 1, as a result, the generation of injurious gas was not seen.

EXAMPLE 3

The post-treatment was carried out on 25 kg of particles shown in Table 1 in the same manner as Example 1 except that the inert gas was obtained by pressure swing adsorption using carbon molecular sieves as adsorbent.

Then, the amount of the inflammable blowing agent remaining in the pre-expanded particles after beginning the supply of the inert gas was measured. The result are shown in Table 5.

TABLE 5

| Time passed (minutes) | Amount of the inflammable blowing agent remaining in the pre-expanded particles (kg) |
| --- | --- |
| 0 | 5 |
| 10 | 1.9 |
| 20 | 0.5 |
| 30 | 0.1 |
| 40 | 0.06 |

The mixed gas of the inflammable blowing agent and the inert gas was discharged from the vessel 1 and fed into the burner 5. Then, the mixed gas was burned with kerosen. During burning, injurious gas was not generated.

In addition to the ingredients used in the Examples, other ingredients can be used in the Examples as set forth in the specification to obtain substantially the same results.

What we claim is:

1. A process for post-treating pre-expanded polyolefin resin particles which comprises charging in a vessel pre-expanded polyolefin resin particles which are pre-expanded by using a flammable blowing agent, supplying an inert gas into the vessel, wherein said inert gas is an inert gas containing not more than 12% by volume of oxygen gas, and discharging the inert gas with the inflammable blowing agent gas extracted from the pre-expanded polyolefin resin particles, from the vessel.

2. The process of claim 1, wherein said inert gas is an inert gas containing a high concentration of nitrogen which is obtained by separating air with a membrane separater.

3. The process of claim 1, wherein said inert gas is an inert gas containing a high concentration of nitrogen which is obtained by separating air with an adsorption separater.

* * * * *